United States Patent
Lee et al.

[11] Patent Number: 6,096,793
[45] Date of Patent: Aug. 1, 2000

[54] FOAM COMPRISING POLYOLEFIN BLEND AND METHOD FOR PRODUCING SAME

[75] Inventors: Shau-Tarng Lee, Oakland, N.J.; James J. Baker, Scotia, N.Y.

[73] Assignee: Sealed Air Corporation, Duncan, S.C.

[21] Appl. No.: 09/219,104

[22] Filed: Dec. 22, 1998

[51] Int. Cl.$^7$ ............................................. C08J 9/00
[52] U.S. Cl. ........................ 521/134; 521/79; 521/81; 525/240
[58] Field of Search ................. 521/79, 81, 134; 525/240

[56] References Cited

U.S. PATENT DOCUMENTS

| | | | |
|---|---|---|---|
| 4,567,219 | 1/1986 | Tominaga et al. | 524/413 |
| 4,649,001 | 3/1987 | Nakamura et al. | 264/50 |
| 4,738,810 | 4/1988 | Cheng-Shiang | 264/54 |
| 4,785,045 | 11/1988 | Yonekura et al. | 524/528 |
| 4,900,490 | 2/1990 | Kozma | 264/54 |
| 4,929,303 | 5/1990 | Sheth | 156/209 |
| 5,000,992 | 3/1991 | Kelch | 428/36.5 |
| 5,032,463 | 7/1991 | Smith | 428/520 |
| 5,053,438 | 10/1991 | Kozma | 521/134 |
| 5,167,765 | 12/1992 | Nielsen et al. | 162/146 |
| 5,290,822 | 3/1994 | Rogers et al. | 521/94 |
| 5,292,815 | 3/1994 | Wreesmann et al. | 525/259 |
| 5,320,887 | 6/1994 | Moss et al. | 428/35.7 |
| 5,393,796 | 2/1995 | Halberstadt et al. | 521/134 |
| 5,462,974 | 10/1995 | Lee | 521/79 |
| 5,502,158 | 3/1996 | Sinclair et al. | 528/354 |
| 5,667,728 | 9/1997 | Lee | 252/350 |
| 5,783,611 | 7/1998 | Strebel | 521/51 |

*Primary Examiner*—Morton Foelak
*Attorney, Agent, or Firm*—Thomas C. Lagaly

[57] ABSTRACT

A foam comprising a blend of a low density polyethylene and an ethylene/alpha-olefin copolymer is disclosed. The ethylene/alpha-olefin copolymer is preferably LLDPE and has a density ranging from about 0.86 to about 0.94 grams/cubic centimeter and a melt flow index of greater than 10 g/10 minutes. A method for producing such foam is also disclosed.

15 Claims, No Drawings

FOAM COMPRISING POLYOLEFIN BLEND AND METHOD FOR PRODUCING SAME

BACKGROUND OF THE INVENTION

The present invention relates generally to polyolefin foams and, more particularly, to extruded foam sheets comprising a blend of low density polyethylene and ethylene/alpha-olefin copolymer.

Polyolefin foams, particularly those made from polyethylene, and methods of manufacturing polyolefin foam sheets are well known in the art. See, e.g., U.S. Pat. Nos. 5,462,974 (Lee), and 5,667,728 (Lee), the disclosures of which are incorporated herein by reference thereto. One of the most common polyolefins used to produce foam is polyethylene and, specifically, low density polyethylene (LDPE). While LDPE possesses a number of beneficial physical and chemical properties when used to produce a foamed sheet, a disadvantage of LDPE is that extruded foam sheets made therefrom have a tear strength that is lower than would otherwise be desired for certain applications.

U.S. Pat. No. 4,738,810 (Cheng-Shiang) teaches that the tear strength and other mechanical properties of an LDPE foam sheet can be improved by blending linear low density polyethylene (LLDPE) with the LDPE. The '810 Cheng-Shiang reference also teaches that the melt index (MI) of the LLDPE should be below 10 g/10 minutes, and preferably between 1 and 7 g/10 min., and that the foam sheet is cross-linked after extrusion.

The inventor hereof has found, however, that when an LLDPE with a MI of less than 10 g/10 min. is blended with LDPE, the shear forces exhibited by the blend increase sharply during extrusion, relative to extruding LDPE alone, resulting in the generation of excess heat. This heat generation was found to degrade the appearance of the resultant foam and lead to inferior mechanical properties due to a high percentage of open cells and non-uniform cell-size and cell-wall thickness. Also, the excess heat reduces the foaming efficiency, i.e., the foam has less void volume and therefore higher density for a given amount of blowing agent.

The foregoing problems are believed to occur because the heat build-up reduces the melt strength of the polymer melt and increases the volatility of the blowing agent, resulting in less void volume and more open cells as the blowing agent escapes from the polymer melt before it can cool sufficiently to form an adequate number of closed cells within which the blowing agent would otherwise be trapped. The increased heat is also believed to reduce the beneficial tendency of the LDPE to exhibit strain hardening during extrusion through a foaming die and during expansion outside of the die. As is known, strain hardening during extrusion and expansion promotes uniform cell-size distribution. One of the reasons that LDPE is commonly used in the production of foams is its strain-hardening capability and resultant promotion of cell uniformity. However, this capability decreases with increasing temperature, as caused, e.g., by the high shear forces exhibited by low MI LLDPE (less than 10 g/10 min.) during extrusion foaming.

Accordingly, a need exists in the art for a polyolefin blend capable of producing an extruded foam sheet with improved mechanical properties but without the drawbacks of using low MI (less than 10 g/10 min.) LLDPE.

SUMMARY OF THE INVENTION

That need is met by the present invention, which provides a foam comprising a blend of a low density polyethylene and an ethylene/alpha-olefin copolymer. The ethylene/alpha-olefin copolymer is preferably LLDPE and has a density ranging from about 0.86 to about 0.94 grams/cubic centimeter and a melt flow index of greater than 10 g/10 minutes.

The low density polyethylene is preferably present in the blend at a weight percentage ranging from about 5 to 75 and the ethylene/alpha-olefin copolymer is preferably present in the blend at a weight percentage ranging from about 25 to about 95, the weight percentages based on the total amount of the low density polyethylene and ethylene/alpha-olefin copolymer in the blend.

The foam is preferably in the form of a foam sheet having a maximum thickness of about 15 millimeters, but can also be a foam "plank" having a thickness of up to about 50 or 50 millimeters. The foam preferably has a density ranging from about 10 to about 150 kg/m$^3$.

In another aspect of the present invention, a method is provided for making a foam, comprising:

a. blending a low density polyethylene and an ethylene/alpha-olefin copolymer having a density ranging from about 0.86 to about 0.94 grams/cubic centimeter and a melt flow index of greater than 10 g/10 minutes;

b. adding a blowing agent to the blend; and c. causing the blowing agent to expand within the blend, thereby forming a foam.

The inventor has determined that an ethylene/alpha-olefin copolymer, such as LLDPE, having a melt index greater than 10 g/10 min. generates far less sheer friction when blended with LDPE than LLDPEs having a MI of less than 10 g/10 min. As a result, less heat is generated during extrusion so that the resultant foams have better appearance and cell formation, i.e., less open cells and more uniformity in cell-size and cell wall-thickness, than foams made with a low MI LLDPE (less than 10 g/10 min.), so that foams in accordance with the present invention also have better mechanical properties and foaming efficiency.

DETAILED DESCRIPTION OF THE INVENTION

A foam in accordance with the present invention comprises a blend of a low density polyethylene (LDPE) and an ethylene/alpha-olefin copolymer having a density ranging from about 0.86 to about 0.94 grams/cubic centimeter and a melt flow index of greater than 10 g/10 minutes. This blend is sometime referred to hereinafter as "the polyolefin blend."

Any LDPE may be used for the polyolefin blend. Preferably, the LDPE has a crystallinity ranging from about 10% to about 55% and a softening point (DSC melt peak) ranging from about 95° C. to about 130° C. More preferably, the crystallinity of the LDPE ranges from about 20% to about 40% and the softening point ranges from about 105° C. to 115° C. The melt index of the LDPE may range from 0.1 to over 50 g/10 min. but preferably ranges from about 1 to about 10 g/10 min.

The ethylene/alpha-olefin copolymer preferably has a melt index (MI) greater than about 12 g/10 min. More preferably, the MI is greater than about 15 g/10 min., such as greater than or equal to about 16 g/10 min., 17 g/10 min., 18 g/10 min., or 19 g/10 min. Most preferably, the MI of the ethylene/alpha-olefin copolymer is greater than or equal to about 20 g/10 min. The MI is determined in accordance with ASTM D-1238.

The ethylene/alpha-olefin copolymer preferably has a density ranging from about 0.91 to about 0.93 g/cc, i.e., the ethylene/alpha-olefin copolymer is preferably but not necessarily a linear low density polyethylene (LLDPE). The alpha-olefin is preferably selected from the group consisting of $C_3$ to $C_{20}$ alpha-olefins, such as propene, 1-butene, 1-pentene, 1-hexene, 1-octene, methyl pentene and the like. Most preferably, the alpha-olefin is 1-butene, 1-hexene or 1-octene. Such ethylene/alpha-olefin copolymers will generally have a DSC melt peak ranging from about 90° to about 140° C. and, more typically, from about 100° to about 125° C.

Preferably, the low density polyethylene is present in the blend at a weight percentage ranging from about 5 to 75 and the ethylene/alpha-olefin copolymer is present in the blend at a weight percentage ranging from about 25 to about 95, the weight percentages based on the total amount of the low density polyethylene and ethylene/alpha-olefin copolymer in the blend. More preferably, the LDPE is present in the blend at a weight percentage ranging from about 50 to about 90 while the ethylene/alpha-olefin copolymer is present at a weight percentage ranging from about 10 to about 50. Most preferably, the weight percentage of the LDPE ranges from about 60 to about 80 while the that of the ethylene/alpha-olefin copolymer ranges from about 20 to about 40.

The foam is preferably an extruded foam sheet. As such, the sheet may have any desired thickness, e.g., 50 mm or less. More preferably, the foamed sheet has a thickness of 40 mm or less, such as 30 mm or less or 20 mm or less. Most preferably, the foamed sheet has a maximum thickness of about 15 millimeters, such as 12 mm or less, 10 mm or less, 8 mm or less, 5 mm or less, etc.

The foam may have any desired density, ranging, e.g., from about 10 to about 150 kg/m³. The density preferably ranges from about 12–100 kg/m³ and, most preferably, from about 15 to 50 kg/m³.

In accordance with another aspect of the present invention, there is provided a method is provided for making the foam as described above. The method generally comprises the steps of a. blending a low density polyethylene and an ethylene/alpha-olefin copolymer having a density ranging from about 0.86 to about 0.94 grams/cubic centimeter and a melt flow index of greater than 10 g/10 minutes;

b. adding a blowing agent to the blend; and c. causing the blowing agent to expand within the blend, thereby forming a foam.

Any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin blend in any desired amount to achieve a desired degree of expansion in the resultant foam. Generally, the blowing agent may be added to the polyolefin blend in an amount ranging from about 0.5 to 80 parts by weight, based on 100 parts by weight of the polyolefin blend (i.e., between 0.5 and 80 weight percent (wt. %) blowing agent). More preferably, the blowing agent is present at an amount ranging from 1 to 30 and, most preferably, from 3 to 15 parts per 100 parts by weight of the polyolefin blend.

If desired or necessary, various additives may also be included with the polyolefin blend. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process as is well known in the art. In such a process, the LDPE and ethylene/alpha-olefin copolymer are added to an extruder, preferably in the form of resin pellets. Any conventional type of extruder may be used, e.g., single screw, double screw, and/or tandem extruders. In the extruder, the resin pellets are melted and mixed. The blowing agent is preferably added to the melted polyolefin blend via one or more injection ports in the extruder. Any additives that are used may be added to the melted polyolefin blend in the extruder and/or may be added with the resin pellets. The extruder pushes the entire melt mixture (melted polyolefin blend, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to expand into cells that solidify upon cooling of the polymer mass (due to the reduction in temperature), thereby trapping the blowing agent within the cells.

The use of an ethylene/alpha-olefin copolymer with a MI greater than 10 g/10 min in a polyolefin blend in accordance with the present invention has been generally found to result in lower processing temperatures, in comparison to lower MI ethylene/alpha-olefin copolymers, in the extruder and die so that a higher quality foam is produced and with a greater foaming efficiency. Specifically, as the examples below demonstrate, foams in accordance with the present invention have a superior appearance and superior mechanical properties in comparison with foams made with lower MI LLDPEs. Foams made with higher MI LLDPE also generally have lower foam densities (higher foaming efficiency) than those made with lower MI LLDPE.

These and other aspects and advantages of the invention may be further understood by reference to the following examples, which are provided for illustrative purposes only and are not intended in any way to be limiting.

EXAMPLES

In each of the following examples, propane was used as a blowing agent to make extruded foam sheets. The amount of blowing agent used was approximately 13 wt. % (±0.5 wt. %), based on the total amount of LDPE and LLDPE in the foam. The following terms are used in the tables below and are defined as follows:

"Foam Appearance" is a qualitative assessment of the foam quality based on the appearance of the foam surface, and is expressed on a scale ranging from 1 to 5, with "5" representing a foam of very high quality (having a smooth surface with very few open cells) and "1" representing a foam of very poor quality (uneven or corrugated surface with many open cells);

"Proc. Temp." is the processing (actual) temperature of the polymer melt as measured at a point between the end of the extruder and the entrance to the die; and "Die Pressure" is the pressure exerted by the polymer melt while flowing through the die, and increases in direct proportion to increases in processing temperature. This measurement thus provides a further indication of any increases or decreases in shear forces within the polymer melt, and is measured in the die, which is slightly downstream of the point in the process at which the processing temperature is measured.

Example 1

A 150 mm diameter twin screw extruder was used to produce foam sheets from LDPE and LLDPE (except for Run 1, a control run). The LDPE was from Novacor (Novacor 219a having a MI of 2 g/10 min. and a density of 0.919 g/cm$^3$) and the LLDPE was from Mobil (Mobil MMA 017 having a MI of 20 g/10 min. and a density of 0.924 g/cm$^3$). Key processing and product parameters are listed below in Table 1.

TABLE 1

| Run # | LDPE Kg/hr | LLDPE Kg/hr | Proc. Temp ° C. | Foam Density Kg/m$^3$ | Foam Appearance | Foam Gauge (mm) | Tear Strength (lb/in) | | |
|---|---|---|---|---|---|---|---|---|---|
| | | | | | | | MD | CMD | Ratio, % |
| 1 | 227 | 0 | 111 | 18.4 | 5 | 3.4 | 4.6 | 9.3 | 49.7 |
| 2 | 214 | 14 | 111 | 20 | 5 | 3.2 | 5.0 | 8.8 | 56.8 |
| 3 | 191 | 36 | 112 | 21.6 | 5 | 3.1 | — | — | — |
| 4 | 155 | 73 | 111.9 | 19.5 | 5 | 3.5 | 6.2 | 8.0 | 77.5 |
| 5 | 155 | 73 | 110 | 17.6 | 5 | 3.6 | 5.4 | 6.9 | 78.3 |

Run 1 was a control run with only LDPE and no LLDPE being employed. In Runs 2–5, LLDPE with a MI of 20 was blended with the LDPE in increasing weight percentages, beginning with Run 2 with 6 wt. % LLDPE and ending with Runs 4 and 5, each having 32 wt. % LLDPE (the wt. % of LLDPE is calculated by dividing the mass flow rate (Kg/hr) of LLDPE for a given run by the combined mass flow rates of LDPE and LLDPE for that run, and multiplying by 100). In comparing the data in Table 1 for Run 1 with the data for Runs 2–5, the processing temperatures exhibited by the LDPE/LLDPE blends of Runs 2–5 were either the same (Run 2), slightly higher (Runs 3–4) or slightly lower (Run 5) than the processing temperature of Run 1. As a result, the foam quality did not degrade with the addition of the 20 MI LLDPE to the LDPE, and remained at a high level ("5") throughout the range of LLDPE that was present in the blend (i.e., from 6 to 32 wt. %). In addition, the foam density did not appreciably increase, and in fact decreased in Run 5, with the addition of the LLDPE to the LDPE.

At the same time, however, the tear strength of the resultant foams of Runs 2–5 improved over the tear strength of the foam produced by Run 1. This is shown by the "Ratio" in Table 1, which is the ratio of the tear strength of the foam as measured in the machine direction ("MD") to the tear strength of the foam as measured in the cross machine direction ("CMD") (also known as the transverse direction, i.e., transverse to the machine direction). The inventor determined that one of the primary reasons that foams made from LDPE alone exhibit insufficient tear strength for certain applications is due to an imbalance between the MD tear strength and the CMD tear strength, with the MD tear strength generally being lower than the CMD tear strength. As the data in Table 1 shows, the MD/CMD ratio favorably improves when LLDPE having a MI of 20 is blended with LDPE, and improves further with increasing amounts of LLDPE.

Example 2 (Comparative)

A tandem extruder with a primary extruder (8.9 cm diameter) and a secondary (downstream) extruder (11.4 cm diameter) were used to extrude a blend of LDPE (Novacor 219a as in Example 1) and a low MI LLDPE (Mobil HCX 002 LLDPE having a melt index of 4 g/10 min. and a density of 0.941 g/cm$^3$) to make various PE foam sheets. As in Example 1, Run 1 was a control run (LDPE only with no LLDPE). The results are set forth in Table 2 below:

TABLE 2

| Run # | LDPE Kg/hr | LLDPE Kg/hr | Proc. Temp. ° C. | Die Pressure Mpa | Foam Density Kg/m$^3$ | Foam Appearance | Foam Gauge mm |
|---|---|---|---|---|---|---|---|
| 1 | 114 | 0 | 110 | 6 | 17.6 | 5 | 3.3 |
| 2 | 102 | 11 | 116 | 8.3 | 20 | 3 | 3.2 |
| 3 | 91 | 23 | 121.7 | 6.9 | — | 1 | — |
| 4 | 91 | 23 | 120.4 | 8.9 | 21.4 | 1 | 3.3 |

As shown, both the processing temperature and the die pressure increased significantly in Runs 2–4 (4 MI LLDPE blended with the LDPE) in comparison with control Run 1. As a result, the foam density increased and the foam appearance degraded due to the addition of the low MI LLDPE to the LDPE.

Example 3

A tandem extruder with a primary extruder (11.4 cm diameter) and a secondary (downstream) extruder (15.2 cm diameter) were used to make foam sheet in accordance with the present invention with Novacor 219a LDPE and Mobil MMA 017 LLDPE (20 MI) resin. Processing conditions and results are set forth in Table 3 below. The foam appearance was a 5 (excellent) in all three runs.

TABLE 3

| Run # | LDPE Kg/hr | LLDPE Kg/hr | Proc. Temp. °C. | Die Pressure Mpa | Foam Density Kg/m³ | Foam Gauge mm | Tear Strength (lb/in.) MD | CMD | Ratio, % |
|---|---|---|---|---|---|---|---|---|---|
| 1 | 314 | 0 | 108.3 | 9 | 17.8 | 3.5 | 7.4 | 11 | 67.3 |
| 2 | 236 | 77 | 111.0 | 8.2 | 17.4 | 2.7 | 9.0 | 12.3 | 73.2 |
| 3 | 205 | 109 | 114 | 8.8 | 19.8 | 2.6 | 10 | 13 | 76.9 |

As in Example 1, the addition of 20 MI LLDPE to LDPE resulted in an improved balance between MD and CMD tear strength (i.e., a higher MD/CMD ratio) while maintaining excellent foam quality. Although the processing temperature appears to have increased with the addition of the LLDPE, the die pressure actually decreased, indicating that any shear-induced heat generation caused by the LLDPE was insignificant and fully dissipated by the time that the polymer melt reached the die. Thus, the temperature of the melt as it exited the die was sufficiently low that a high quality foam was formed.

Example 4 (Comparative)

A 120 mm diameter twin screw extruder was used to produce foam sheets from LDPE and LLDPE (except for Run 1, a control run). The LDPE was from Novacor (Novacor 2 19a having a MI of 2 and a density of 0.919 g/cm³) and the LLDPE was from Mobil (Mobil MCA 123 having a MI of 2 g/10 min. and a density of 0.918 g/cm³). Key processing and product parameters are listed below in Table 4.

TABLE 4

| Run # | LDPE Kg/hr | LLDPE Kg/hr | Proc. Temp. °C. | Die Press. MPa | Foam Density Kg/m³ | Foam Appearance | Foam Gauge mm | Cells #/in | Comp. Strength @25% (psi) |
|---|---|---|---|---|---|---|---|---|---|
| 1 | 205 | 0 | 110.6 | 9.3 | 17.6 | 5 | 3.4 | 23 | 3.93 |
| 2 | 184 | 21 | 113.7 | 11.5 | 17.6 | 4 | 3.25 | 21 | 3.86 |
| 3 | 164 | 41 | 115.6 | 11.2 | 30.4 | 1 | 2.9 | 19 | 2.83 |

1) "Cells #/in" is the number of closed cells per lineal inch of foam.
2) "Comp. Strength @25%" is the compressive strength of the foam (reported as pounds/in²(psi)) as measured at 25% compression in accordance with ASTM 3575-93 (D).

Both processing temperature and die pressure increased with the addition of the 2 MI LLDPE. As a result, particularly with respect to Run 3 (20 wt. % 2 MI LLDPE), the foam appearance degraded and the foam density increased. In addition, in Runs 2 and 3, the compressive strength, foam gauge, and the number of closed cells per inch all decreased in comparison with Run 1. These parameters are indicators of foam quality, and the fact that all three decreased with an increasing amount of 2 MI LLDPE clearly shows the detrimental effect of blending low MI LLDPE with LDPE. In particular, the decrease in compression strength due to the addition of the low MI LLDPE indicates a decrease in uniformity of both the cell-size distribution and the cell-wall thicknesses of the foam.

Example 5

A 150 mm diameter twin screw extruder was used to produce foam sheets from LDPE and LLDPE (except for Run 1, a control run). The LDPE was Novacor 219a. The LLDPE was also from Novacor (Novacor PI 2024a LLDPE having a MI of 20 g/10 min. and a density of 0.924 g/cm³). The processing conditions and results are set forth in Table 5 below:

TABLE 5

| Run # | LDPE Kg/hr | LLDPE Kg/hr | Proc. Temp. °C. | Die Press. Mpa | Foam Density Kg/m³ | Foam Appearance | Foam Gauge mm | Comp. Strength @25% (psi) |
|---|---|---|---|---|---|---|---|---|
| 1 | 227 | 0 | 110.8 | 8.4 | 18.7 | 5 | 3.4 | 3.3 |
| 2 | 182 | 45.4 | 111.4 | 8.2 | 19.7 | 5 | 3.0 | 3.4 |
| 3 | 136 | 91 | 111.4 | 8.0 | 17.1 | 5 | 3.4 | 3.55 |
| 4 | 91 | 136 | 111.6 | 7.6 | 16.8 | 4 | 3.5 | 4.0 |

"Comp. Strength @25%" is the compressive strength of the foam (reported as pounds/in²(psi)) as measured at 25% compression in accordance with ASTM 3575-93 (D).

The addition of the 20 MI LLDPE to the LDPE resulted in a decrease in die pressure and only a slight increase in processing temperature, leading to a foam with an excellent appearance (although a slight degradation was observed in Run 4 with 60 wt. % LLDPE). The foam density rose slightly in Run 2 but decreased in Runs 3 and 4. In addition, and in direct contrast with comparative Example 4, the compressive strength of the foam increased with increasing amounts of 20 MI LLDPE, indicating that the LLDPE contributed to a more uniform distribution of cell-sizes and cell-wall thicknesses in the foam. Thus, an excellent foam was produced in accordance with the present invention, particularly in Run 3 with 40 wt. % 20 MI LLDPE.

What is claimed is:

1. A foam, comprising a blend of a low density polyethylene and an ethylene/alpha-olefin copolymer having a density ranging from about 0.86 to about 0.94 grams/cubic centimeter and a melt flow index of greater than 10 g/10 minutes.

2. The foam of claim 1, wherein the melt flow index of said ethylene/alpha-olefin copolymer is greater than about 12 g/10 minutes.

3. The foam of claim 2, wherein the melt flow index of said ethylene/alpha-olefin copolymer is greater than about 15 g/10 minutes.

4. The foam of claim 1, wherein said ethylene/alpha-olefin copolymer has a density ranging from about 0.91 to about 0.93 g/cc.

5. The foam of claim 1, wherein said low density polyethylene is present in said blend at a weight percentage ranging from about 5 to 75 and said ethylene/alpha-olefin copolymer is present in said blend at a weight percentage ranging from about 25 to about 95, said weight percentages based on the total amount of said low density polyethylene and ethylene/alpha-olefin copolymer in said blend.

6. The foam of claim 1, wherein said foam is in the form of a foam sheet having a maximum thickness of about 15 millimeters.

7. The foam of claim 1, wherein said foam has a density ranging from about 10 to about 150 kg/m$^3$.

8. A method of making a foam, comprising:

a. blending a low density polyethylene and an ethylene/alpha-olefin copolymer having a density ranging from about 0.86 to about 0.94 grams/cubic centimeter and a melt flow index of greater than 10 g/10 minutes;

b. adding a blowing agent to said blend; and c. causing said blowing agent to expand within said blend, thereby forming a foam.

9. The method of claim 8, wherein the melt flow index of said ethylene/alpha-olefin copolymer is greater than about 12 g/10 minutes.

10. The method of claim 9, wherein the melt flow index of said ethylene/alpha-olefin copolymer is greater than about 15 g/10 minutes.

11. The method of claim 8, wherein said ethylene/alpha-olefin copolymer has a density ranging from about 0.91 to about 0.93 g/cc.

12. The method of claim 8, wherein said low density polyethylene is present in said blend at a weight percentage ranging from about 5 to 75 and said ethylene/alpha-olefin copolymer is present in said blend at a weight percentage ranging from about 25 to about 95, said weight percentages based on the total amount of said low density polyethylene and ethylene/alpha-olefin copolymer in said blend.

13. The method of claim 8, wherein said step of causing said blowing agent to expand is accomplished by extruding said blend and blowing agent through a die and into a region of reduced pressure.

14. The method of claim 13, wherein said foam is extruded as a foam sheet having a maximum thickness of about 15 millimeters.

15. The method of claim 8, wherein said foam has a density ranging from about 10 to about 150 kg/m$^3$.

\* \* \* \* \*